(12) United States Patent
Hermann (10) Patent No.: US 6,606,667 B1
(45) Date of Patent: Aug. 12, 2003

(54) BALANCED NETWORKS

(75) Inventor: Karen E. Hermann, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 658 days.

(21) Appl. No.: 09/579,501

(22) Filed: May 30, 2000

(51) Int. Cl.$^7$ .............................................. G06F 15/173
(52) U.S. Cl. ...................... 709/239; 709/238; 709/227; 370/216; 370/223; 370/228
(58) Field of Search ................................ 709/227, 238, 709/239; 370/216, 22

(56) References Cited

U.S. PATENT DOCUMENTS

| | | | | |
|---|---|---|---|---|
| 5,517,489 A | * | 5/1996 | Ogura | 370/223 |
| 5,717,796 A | * | 2/1998 | Clendening | 385/24 |
| 5,920,412 A | * | 7/1999 | Chang | 398/83 |
| 6,331,906 B1 | * | 12/2001 | Sharma et al. | 398/48 |
| 6,353,593 B1 | * | 3/2002 | Chen et al. | 370/216 |
| 6,366,875 B1 | * | 4/2002 | Colizzi et al. | 703/16 |
| 6,400,859 B1 | * | 6/2002 | de Boer et al. | 385/24 |
| 6,426,941 B1 | * | 7/2002 | Vaman et al. | 370/228 |
| 6,490,062 B1 | * | 12/2002 | Besati et al. | 398/4 |
| 6,529,298 B1 | * | 3/2003 | Phelps et al. | 398/5 |

* cited by examiner

Primary Examiner—David Wiley
Assistant Examiner—Phuoc H. Nguyen (57) ABSTRACT

A network architecture is provided for increasing the working/protection bandwidth ratio (W/PBR) in the transport networks. The balanced network provides for a plurality of arm networks between two nodes of interest, the arms having identical bandwidth allocation for the add/drop, passthrough and protection traffic. In the case of a failure on an arm, the affected traffic is equally distributed in the protection bandwidth of the unaffected arms. The add/drop and passthrough traffic of the unaffected arms is also re-balanced between the unaffected arms.

13 Claims, 5 Drawing Sheets

BALANCED NETWORKS

BACKGROUND OF THE INVENTION

1. Field of the Invention

The invention is directed to an architecture for a communication network and in particular to a network architecture with traffic balancing.

2. Background Art

Network users and providers are looking for reliable networks at acceptable bandwidth (BW) cost. Reliability is the ability of the network to carry the information from source to destination with errors below a certain threshold.

Protection is a traffic preserving strategy for managing the usage of the working and the dedicated protection (redundant) bandwidth in the network. Automatic protection acts at the physical layer (see OSI layers) quickly enough to ensure that the client's connections remain unaffected by failures. SONET/SDH (synchronous optical network/ synchronous digital hierarchy) is provided with very effective and fast protection mechanisms, which make this technology a strong contender for the networks of the future.

Typically, protection switching times are less than 50 ms for SONET. On the other hand, protection implies reserving bandwidth, and therefore transport networks are often 100% overbuilt.

SONET/SDH protection protocols are designed for various network configurations, such as linear networks (1+1; 1:1 and 1:N protection schemes) and ring networks (unidirectional path switched rings UPSR and bidirectional line switched rings BLSR). As well known, the two digits used to define the type of protection, refer to the number of "protection" (spare) fibers and the "working" fibers for a certain span. 1+1, UPSR and 1:1 schemes require 100% redundancy. 1:N, 2F (two-fiber)-BLSR and 4F-BLSR schemes require less than 100% network overbuild, as extra traffic (traffic of lower priority) may be carried between nodes on the protection bandwidth/fibers during normal operation conditions. The extra traffic is however lost when a protection switch occurs.

There is a need to transport traffic at high speed with a better use of the available bandwidth than afforded by the current SONET rings.

SUMMARY OF THE INVENTION

It is an object of the present invention to provide a network architecture and bandwidth (BW) balancing strategy that will allow use of more that 50% of the network capacity to transmit working traffic.

According to one aspect of the invention, there is provided a balanced network for transporting a traffic signal with a working-to-protection bandwidth ratio higher than 0.5, comprising a ring network for connecting a first node and a second node, said nodes defining a first and a second ring arm, one or more mesh arms connecting said first node and said second node, wherein each arm includes one or more ADM nodes, and each arm has a protection bandwidth of 1/NBW and a working bandwidth of (N−1)/N BW, where BW is the capacity available on any line of said network, and N is the number of arms connecting said first and second nodes.

According to another aspect of the invention, there is provided a balanced network for transporting a traffic signal with a working-to-protection bandwidth ratio higher than 0.5, comprising a ring network for connecting a first node and a second node, said nodes defining a first and a second ring arm, one or more mesh arms connecting said first node and said second node, wherein each arm includes one or more ADM nodes, and each arm has a working bandwidth of (N−M)/N BW, where BW is the capacity available on any line of said network, N is the number of arms connecting said first and second nodes, and M is the number of full line faults in said network.

In yet another aspect of the invention, there is provided A method for creating a balanced transport network with a working/protection bandwidth ratio higher than 0.5, comprising providing N arms between a first and a second node of balanced network, each arm comprising one or more ADM nodes, allocating to each said arm a working bandwidth of (N−1)/N BW and a protection bandwidth of 1/N BW, where BW is the capacity available on any line of said network.

Advantageously, by allowing protection of more than 50% of the working BW, a network provider would earn more revenue per unit of BW. In addition, the solution proposed herein is simple and inexpensive to implement.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

The term 'arm network' or 'arm' or 'chain' is used in this description to define the physical connection between two hub nodes. The arm connection may be a single fiber or a two-fiber line, accommodating bidirectional communication. An arm may comprise one or more add/drop multiplexing (ADM) nodes.

An ADM is a network element that separates an incoming signal into a drop component and a passthrough component, and adds to the outgoing signal an add component. The drop component is addressed to the respective ADM node for local use, or is for transmission towards a final destination over another network. The passthrough component is.addressed to another node of the network, and is passed by the ADM node from the incoming signal to the outgoing signal unchanged. The add component is generated locally at the ADM node, or is received by the ADM node from another network, being addressed to a node of the network. The terms 'drop bandwidth', 'add bandwidth' and 'passthrough bandwidth' designate the capacity allocated to the respective add, drop and passthrough traffic components.

The term 'line' refers to the connection between two adjacent add/drop nodes. In this specification, all lines have the same capacity, denoted with 'BW'. It is however to be understood that this assumption is for simplifying the definition of the balanced network architecture and operation. Higher bandwidth may be allocated between certain selected nodes of the network, but this traffic is not taken into account for the purpose of this invention.

Figure 1:
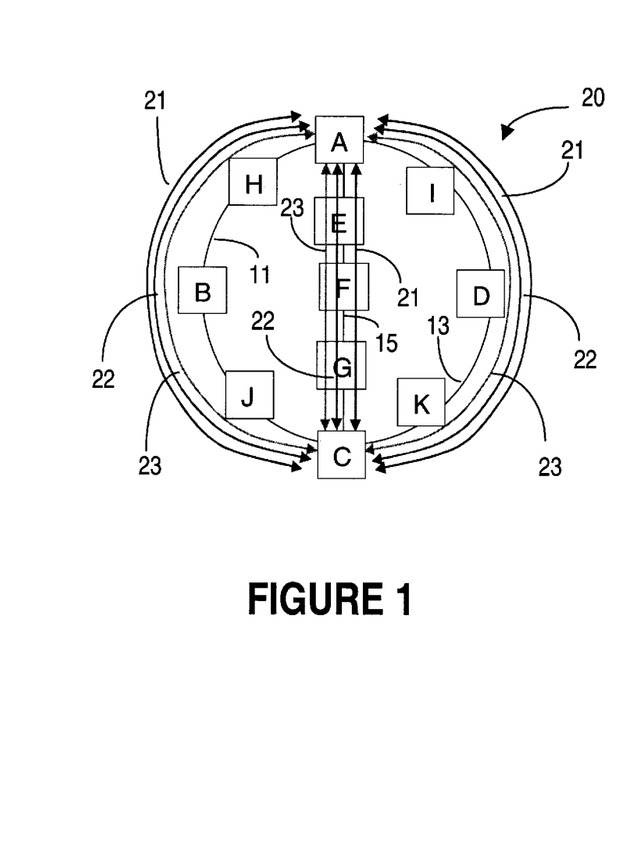
FIG. 1 illustrates a three-arm balanced network according to the invention, in normal (idle) mode of operation.

FIG. 1 illustrates a balanced ring-mesh network 20 according to the invention, showing the traffic distribution for a configuration with three arms 11, 15 and 13 connecting hub nodes A and C. Arm 11 connects hub nodes A and C over ADM nodes H-B-J, arm 13 connects hub nodes A and C over nodes I-D-K, and arm 15, over nodes E-F-G. Arms 11, 13 and 15 are mutually protective ADM arms. Clearly, more arms may be provided between hub nodes A and C, the number of arms being denoted with N in this description for the general case.

The capacity for this network, as seen by the signals travelling on any span other than from node A to C is 50% working traffic and 50% protection traffic (i.e. the working traffic uses ½BW) and is not affected by the presence of arm 15. More complex balanced networks can be envisaged, where another pair of hub nodes may be connected by a plurality of arms, as it will be discussed later.

The bandwidth BW available on all lines of network 20 is distributed so as to provide an increase of the working traffic between nodes A and C from ½BW (50%) to ⅔BW for example. This distribution results in a decrease in the bandwidth reserved for the protection traffic from ½BW to ⅓BW.

We now balance the working traffic among arms 11, 15 and 13 to allocate ½BW to add/drop traffic 21, denoted herein with $W_{adm}$, and ⅙BW to passthrough traffic 23, denoted herein with $W_{pt}$. Reference numeral 22 designates the protection traffic. The add/drop traffic $W_{adm}$ can be routed in any way that the network operator chooses. In this way, when idle, the traffic components would have the same BW allocation on all arms, resulting in a balanced network 20 with fully protected working traffic load of 66%, determined as discussed above. Namely, the working bandwidth W and protection bandwidth P for the traffic between hub nodes A and C has the following composition:

$W=½BW(W_{adm})+⅙BW(W_p)=⅔BW$ $P=1-⅔=⅓BW$

Figure 2:
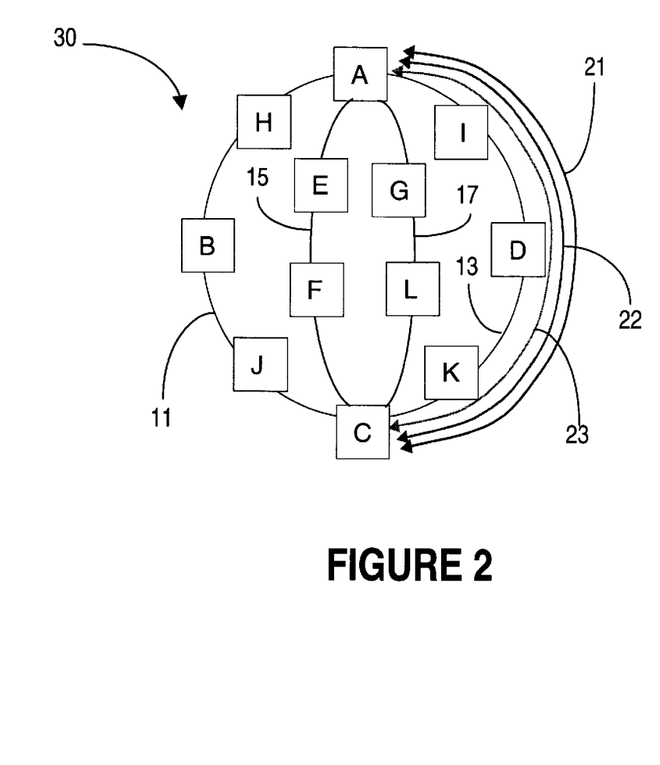
FIG. 2 illustrates a 4-arm balanced network in normal (idle) mode of operation.

FIG. 2 illustrates another example of a balanced network 30. Network 30 has four arms 11, 13, 15 and 17 connecting nodes A and C. In this example, the traffic components are shown in FIG. 2 only for arm 13 for simplification. The traffic composition for each arm is:

$BW=¼BW(W_{pt})+½BW(W_{adm})+¼BW(P)$

This configuration results in a working bandwidth between nodes A and C of 75% (passthrough and add/drop), and a 25% protection BW. This is a marked improvement from the 50% ratio available today to the working traffic.

For the general case of N arms, the capacity on each arm is allocated as follows $W_{adm}=½BW$ $W_{pt}=(N-2)/2NBW$ $P=1/NBW$ \hfill EQ(1)

Figure 3:
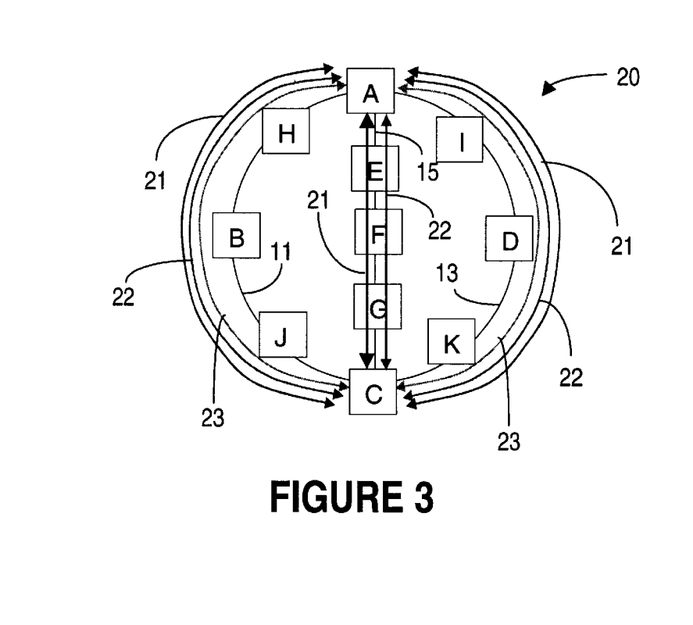
FIG. 3 illustrates a single fiber re-balance for the network of FIG. 1.

A balanced network is re-balanced whenever the traffic in one or more arms is interrupted to accommodate either a failure or maintenance. FIG. 3 shows network 20 of FIG. 1 with a single fiber re-balance. The term 'single' refers to re-balancing of the traffic on a single arm, which is arm 15 (A-E-F-G-C) in this example. The capacity of network 20 in the idle state before re-balance, is according to EQ(1) for N=3:

$W_{adm}=½BW$ $W_{pt}=⅙BW$ $P=⅓BW$

If arm 15 is interrupted between two ADM nodes, the A–C passthrough traffic 23 on arm 15 is shunted onto the other two ring arms 11 and 13. The add/drop traffic between the ADM nods on either side of the interruption remains unchanged, and uses now 50%BW. Since traffic on arm 15 is interrupted, the add/drop traffic affected by the interruption (between nodes on different sides of the interruption) may use the protection bandwidth on arm 15.

The total passthrough traffic between nodes A and C in network 20 of FIG. 1 is:

Total $W_{pt}$=3 arms×⅙BW/arm=½BW

The passthrough traffic travelling in arm 15 before interruption is evenly re-distributed between arms 11 and 13. Even distribution is for this example, but not necessary. Thus, all passthrough traffic may be directed on arm 11. In the case of even distribution, half of the passthrough bandwidth on arm 15, i.e. 1/12BW goes on each of the unaffected arm, in the protection BW. The protection BW on each ring arm 11, 13 now becomes:

$P_R=⅓-1/12=¼BW$, or $P_R$=Total $W_{pt}$:2=¼BW

The A–C traffic in the arms 11 and 13 has now the following composition:

$BW=¼BW(W_{pt})+¼BW(P)+½BW(W_{adm})$, and for arm 15:

$BW=½BW(W_{adm})+½BW(P)$.

If arm 15 is a four fiber connection, the traffic balancing scheme shown in FIG. 3 would allow to perform span switches along it and do maintenance or recover from multiple line faults.

Figure 4:
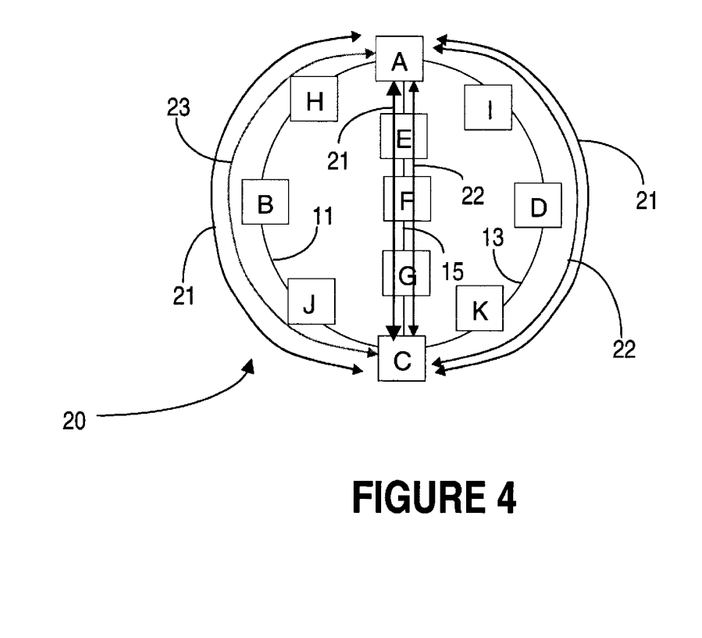
FIG. 4 illustrates a double fiber re-balance for the network of FIG. 1.

FIG. 4 illustrates a double fiber re-balance for network 20. The term 'double' refers to re-balancing of traffic to accommodate a failure or maintenance on two arms, here arms 13 and 15. As before, the A–C passthrough traffic $W_{pt}$ from the affected arms has to be shunted onto arm 11. The traffic in the arms has the following composition:

Arm 11 $BW=½BW(W_{pt})+½BW(W)$,

Arm 13 $BW=½BW(W)+½BW(P)$, and

Arm 15 $BW=½BW(W)+½BW(P)$.

The protection bandwidth of the affected arms 13 and 15 accommodates the add/drop traffic 21 between the nodes on the same side of the interruption. The add/drop traffic across the interruption is accommodated by the passthrough bandwidth (the passthrough traffic was diverted over arm 11). If arms 15 and 13 are comprised of four fibers (4F), then the traffic balancing scheme of FIG. 4 would allow to perform span switches along the spans of these arms, to do maintenance and to recover from multiple line faults on both lines at the same time.

To summarize, the balanced network has high working/protection bandwidth ratio, it can suffer a single node failure (either hub or add/drop node), it can suffer multiple line failures on two separate arms, and it can accommodate maintenance on all spans of two separate arms (this includes the ring).

Figure 5:
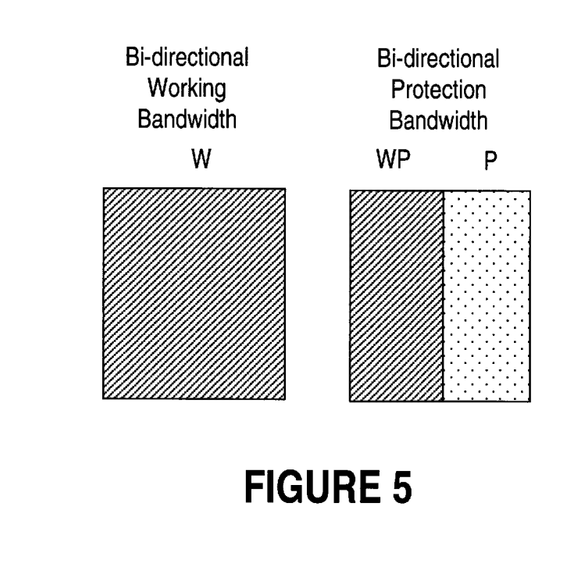
FIG. 5 shows traffic distribution on the lines of a N:M balanced network.

FIG. 5 shows traffic distribution on the lines of a N:M balanced network. 'M' is the number of full line faults and 'N' is the number of arms. Each arm that is discussed herein is assumed to be bi-directional with both working and protection fibers. Sometimes it is necessary to do maintenance on the working fibers along a certain span of a network. To accommodate this type of maintenance in a BLSR network, the traffic on the working line is switched onto the protection line temporarily. This is called a span switch. In a balanced network all of the bandwidth on the working line will be used to carry working traffic. This bandwidth is denoted as "working bandwidth" W. Some of the BW on the protection line will also be used to carry working traffic, and this will be denoted as "working protection bandwidth" or WP. The rest of the bandwidth on the protection line will be used to protect in case of line failures in the network and will either remain unused or may carry extra traffic in the idle state. This bandwidth will be denoted as "protection bandwidth" or P.

The percentage of working traffic to be carried in such a balanced network can be calculated using the following equation:

$$\left(\frac{N-M}{N}\right) \times 100\% \qquad \text{EQ (2)}$$

This assumes that all lines are of equal BW. The BW available on each line will be denoted as before with BW. If the lines are not of equal bandwidth, it is possible to calculate the maximum allowable working traffic on each line but the calculation becomes more involved.

The working bandwidth W may drop or add traffic to the network at ADM nodes. The WP bandwidth is used to transmit traffic strictly between hub nodes A and C in balanced network 40.

Figure 6:
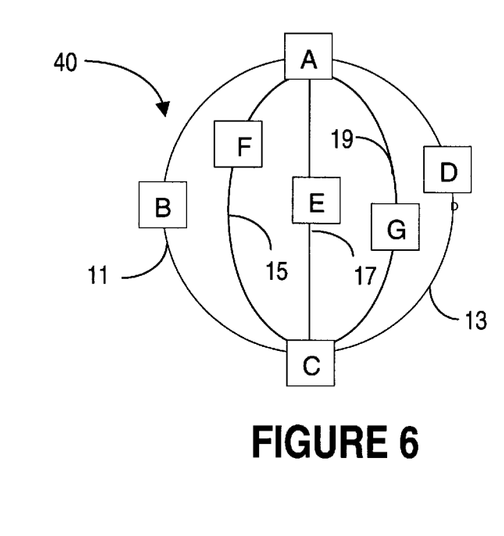
FIG. 6 is a further example of a 5-arm balanced network.

FIG. 6 shows a balanced network with five arms for discussing the general case where, for a network 40 with N arms connecting two hub nodes A and C. The arms between hub nodes A and C are denoted with 11, 13, 15, 17, and 19.

For a single re-balance, in the general case of a balanced network with N arms, each arm is allocated 50%, or half of the line BW for the working add/drop traffic, (N−2)/2N for the passthrough traffic and 1/N for the protection traffic. In the case of a failure, the passthrough traffic of the failed arm is equally divided between the remaining arms. It is to be understood that the traffic may be divided in any proportion. Namely, the $W_{pt}$ is divided by (N−1), so that each unaffected arm will have the following bandwidth allocation:

$W_{pi}=(N-2)/[2(N-1)]BW$ $W_{adm}=½BW$ $WP=1/[2(N-1)]BW \qquad \text{EQ(3)}$

For N=5 and M=2, i.e. in the case of two line failures (or double fiber re-balance), the above EQ(2) will give:

$W=(5-2)/5 \times 100\% BW = 60\% BW$ $P=40\% BW \qquad \text{EQ(4)}$

Therefore, each line will have 40%BW reserved to protect against line failures in the network. If arm 11 fails, the working traffic previously accommodated by this arm will be redistributed on the protection bandwidth of arms 13, 15, 17 and 19. At this point, arms 13, 15, 17 and 19 will be carrying 60% BW of working traffic W and 15%BW of protection traffic P for a total working traffic of 75%BW If arm 13 also fails, the 75%BW traffic it carried before failure will be re-distributed between arms 15, 17 and 19, namely 75%BW: 3 arms=25%BW on each remaining arm, in addition to the traffic carried before arm 13 failure. Thus, arms 15, 17 and 19 will be carrying:

$W=60\% BW$ $P=15\%+25\%=40\% BW$

In the cases where a span switch must be performed (for maintenance purposes or LOS on the working line) on balanced network 40, the following would occur:

The working traffic travelling on the WP bandwidth would be redistributed to the P bandwidth on one or more arms of the balanced network.

The W bandwidth would be span switched onto the WP and P bandwidth on protection line.

Maintenance may then safely be performed on the working span.

Note that this does not really apply to 2FR because the working and protection BW are both in the same fiber so no span switches may be performed.

Assume that arms 11, 13, 15, 17, and 19 Of network 40 are all bi-directional lines with unequal capacity. Let denote the units of capacity with x. The arbitrary value of the capacity on each line is, for example, as described next, where we assume that the working capacity for each arm is represented by lowercase letters a, b, c, d and e, as follows:

Arm 11 of bandwidth a uses 70x, Arm 13 of bandwidth a uses 20x, Arm 15 of bandwidth c uses 100x, Arm 17 of bandwidth d uses 150x, and Arm 19 of bandwidth e uses 50x.

Let us also assume that we want to protect this network against two line failures. We must figure out what the absolute maximum protection capacity must be for this network. To do this we examine a worst case scenario where the M lines that fail are the highest capacity lines. Then we solve the corresponding equation:

$\Sigma W_{failedarms} = (\Sigma(T-W))_{workingarms} - E \qquad \text{EQ(5)}$

Where $W_{failedarms}$ is the working bandwidth on a failed arm, T is the total bandwidth on non-failed (operating) arm and E is extra leftover protection bandwidth, if any. In our example case, M=2 and the two highest capacity lines are arms 15 and 17. There will be no extra protection bandwidth in the worst case scenario.

EQ(5) would give for this example:

$c+d=(70x-a)+(20x-b)+(50x-e)-0$

Thus, $$a+b+c+d+e=140x$$

This means that the total working BW that can be supported in this network is 140x. To determine the working capacity for each arm, the working bandwidth distribution can be derived by looking at all scenarios in the form of EQ(5). These linear equations could then be solved using a number of different methods, which would yield the ideal traffic distribution.

It is obvious from this discussion that it is much simpler to have equal capacity on each line and an equal traffic distribution on the balanced network.

Just as it was possible to run multiple lines across a ring, it is also possible to support multiple balanced mesh networks in a ring. The following example will show only two balanced networks on the same ring, but this may be done with more balanced mesh networks, all being protected by the same ring.

Figure 7:
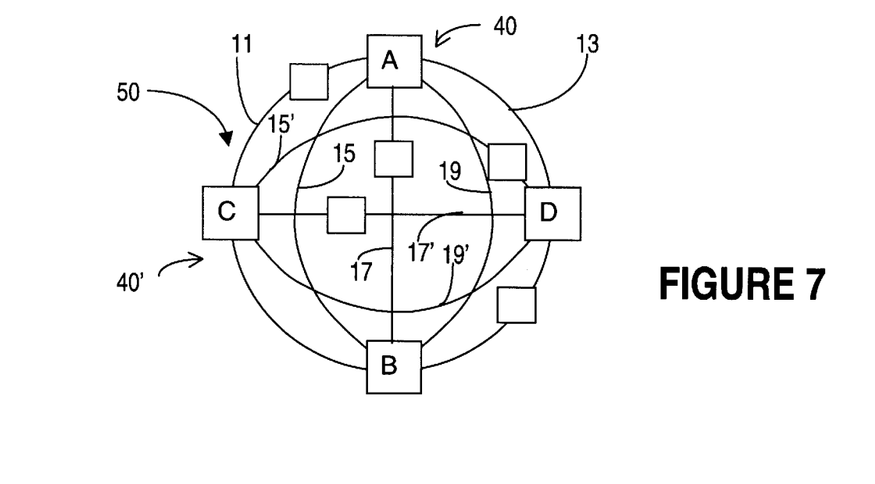
FIG. 7 shows a multiple balanced ring-mesh network.

FIG. 7 shows network 50 comprising a BLSR ring with four hub nodes A, C, B and D. Nodes A and B act as hub nodes for a balanced network 40, with arms 11, 13, 15, 17 and 19. Nodes C and D act as hub nodes for a balanced network 40', with arms 11', 13', 15', 17' and 19'. There may be as many ADM nodes on each arm as the network operator requires. The ADM nodes are unlabelled for simplification.

In the idle state, 50%BW to the traffic on ring A-B-C-D is always allocated to the working component and 50%BW to the protection component. As before, N is the number of paths including the ring arms, and M is the number of faults that the balanced network is protected against. The protection bandwidth on the ring will protect the ring and both balanced networks 40 and 40' in a 1:3 protection scheme. The central arms, i.e. arms 15, 17 and 19 for network 40 and arms 15, 17 and 19' for network 40' run 100% working traffic.

If the balanced network is protecting against more than 1 failure (i.e. M>1) the traffic distribution in the ring arms 11 and 13 will still be 50%BW working traffic. The working traffic on the non-ring arms will be:

$$(N-M-1)/(N-2)\%BW \qquad \text{EQ(6)}$$

Note that EQ(6) is derived from EQ(2). Since the ring arms add two distinct paths and supply protection for one path we factor this into EQ(2) when calculating the working traffic distribution for the non-ring arms.

Thus, for M=2 in the case of balanced network 40, the non-ring arms 15, 17 and 19 will carry $(5-2-1)/(5-2)=2/3=66.6\%$BW of working traffic. This is again a marked improvement over existing architectures.

FIGS. 8A–8D show a practical example of a SONET network 60 designed to address the optical transport needs of the US market. Specifically, it addresses the need to transport a large quantity of traffic from the East to the West coasts, while supporting a lighter traffic flow from North to South. In other words the available East-West working bandwidth is maximized at the cost of the North-South working bandwidth.

Figure 8A:
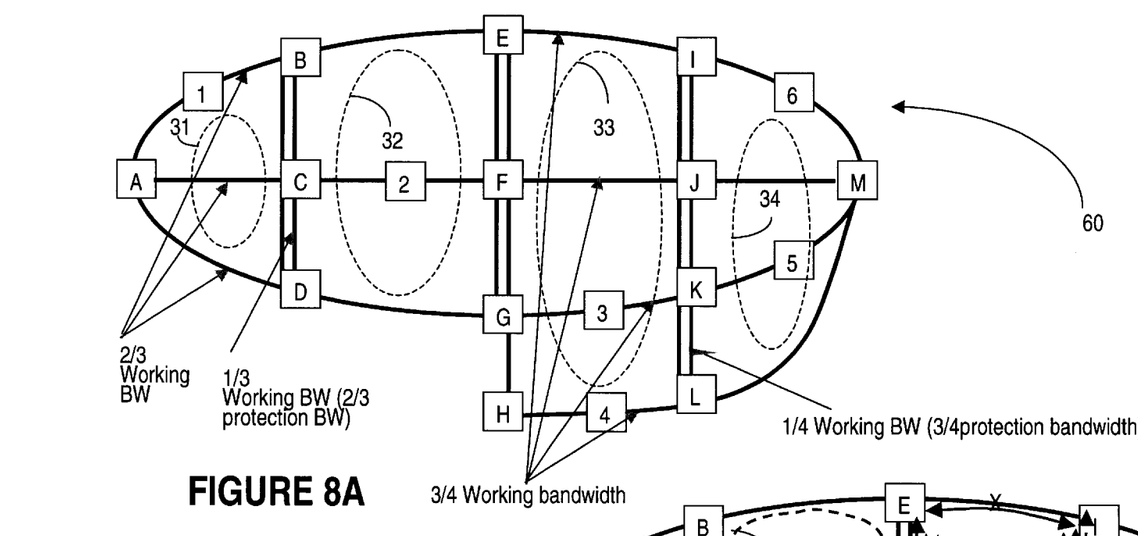
FIG. 8A shows an example of a segmented balanced network designed to address optical transport needs of the US market.

We note with 'm' the number of full line faults a ring can tolerate and with 'N', again the number of the arms of the balanced network. We assume, for simplification, that hub nodes A and M would only originate or terminate signals; no passthrough signals are allowed for these nodes. These nodes could be for example in Los Angeles and New York. Linking nodes A and M are four BLSR rings 31, 32, 33, and 34, that have been converted into balanced networks. Rings 31 and 32 have three arms each between hub nodes A and C; and C and F, respectively. Thus, rings 31 and 32 can run $2/3$BW of working traffic. Rings 33 and 34 have four arms each, and thus can run $3/4$BW of working traffic.

In this arrangement the East-West arms will run the maximum working bandwidth available on the ring, which is $(N-m)/N=2/3$BW The North-South arms will run an equal amount of $2/3$BW for protection traffic, which leaves only $1-(N-m)/N=1/3$BW for working traffic. The reason for this distribution of working bandwidth will become apparent during the following protection switching discussion.

All of the nodes marked with letters A, B, . . . M have access to 100%BW of the working BW for ADM traffic. The numbered nodes 1, 2, . . . 6 only have access to 50% BW for ADM traffic. These nodes behave in the same way as the ADM nodes behave in the balanced network of FIGS. 1, 2 or 7.

Figure 8B:
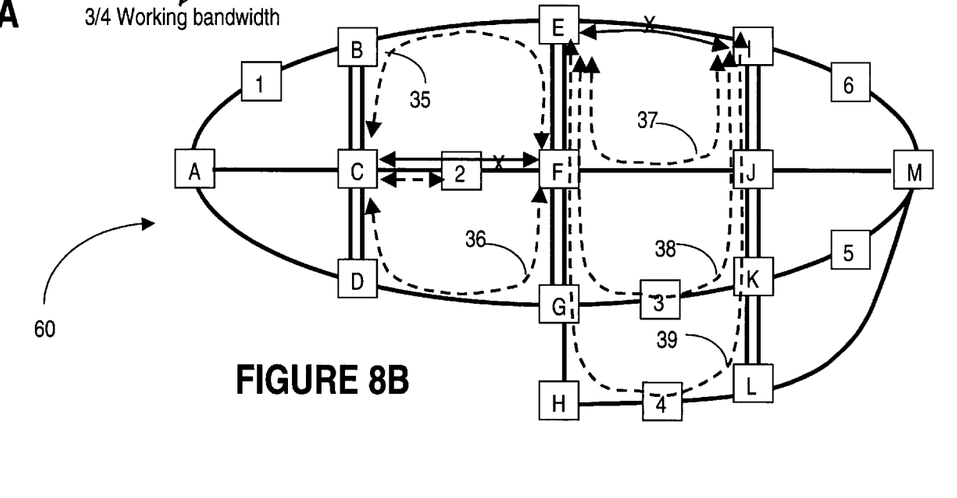
FIG. 8B illustrates traffic re-distribution in case of multiple East-West line failures for the network of FIG. 8A.

FIG. 8B shows that the link between nodes 2 and F, and nodes E and I have failed. We will discuss the re-balancing due to the break between nodes 2 and F first.

In this case, the network will have to ultimately compensate for a break between nodes C and F. As indicated above, node 2 is an ADM node with access to only 50%BW. The rest of the traffic simply passes through node 2. Node 2 will use the restoration technique described above. Node C will re-route all traffic that was supposed to travel between node 2 and node F on the protection bandwidth of the arms 35 and 36 of the ring 32 (B-C-D-G-F-E). Once the traffic is received at node F, it will be put back onto the working BW. ADM traffic between nodes C and 2 is unaffected.

The traffic between nodes E and I affected by the second fault, is restored in a similar way, but without consideration for ADM traffic, as there is no ADM node on this failed line. Note that there are now three restoration paths 37, 38 and 39. Note as well that all of the protection BW between nodes E and F is required to reroute the $3/4$ working traffic that was originally travelling between E and I, since all three restoration paths use the line between nodes F and E.

Figure 8C:
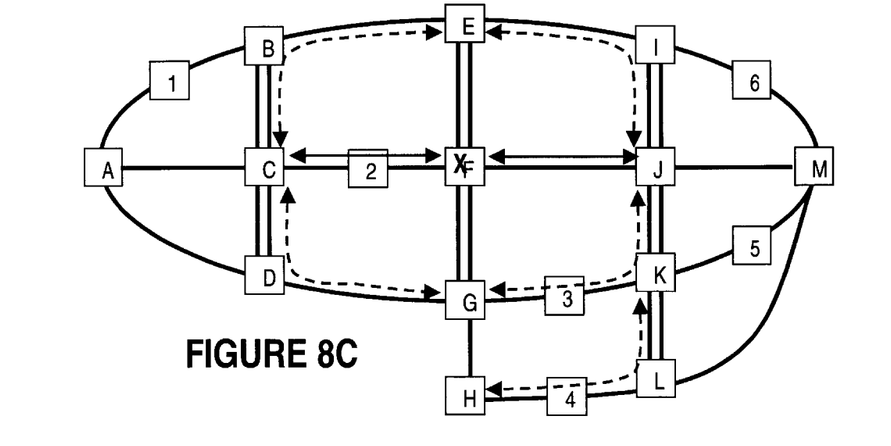
FIG. 8C shows traffic redistribution for the segmented balanced network of FIG. 8A in case of a node failure.

FIG. 8C shows how network 60 recovers if a node with access to 100% of the working bandwidth fails (e.g. node F). In this case, the North-South working traffic that regularly runs through the failed node, cannot be protected by the network. The East-West traffic is protected using the protection BW of the two rings 32 and 33 that are involved.

Note that the working traffic between nodes C and F uses $2/3$BW, while the working traffic between nodes F and J uses $3/4$BW. Therefore, only $2/3$BW of working traffic could possible have been passing between ring 32 and 33 via node F. This means that the protection bandwidth available in ring 32 is sufficient to protect all working traffic that could be passing between the rings.

Also note that any signals that were travelling from node E to node G through node F will be lost.

Figure 8D:
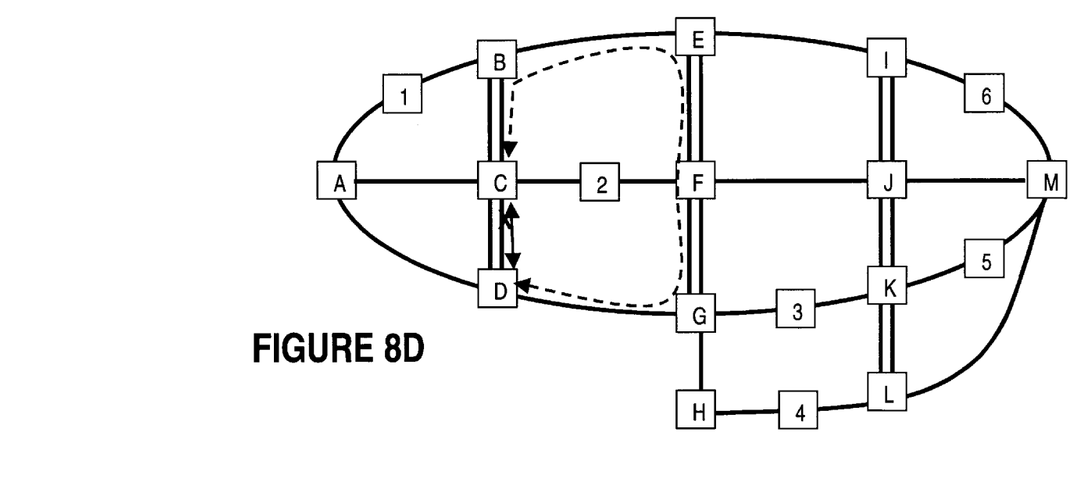
FIG. 8D shows traffic redistribution in case of a North-South line failure.

FIG. 8D shows a scenario where the link between nodes C and D breaks. The restoration for this type of failure would be a simple BLSR ring switch on ring 32, that is implemented in the current OC192 products.

It is possible to remove the double fibers running North-South between nodes B and D and nodes E and G. This is however not recommended, as it would put limitations on the type of multiple failures that this network can restore. If two rings share a North-South link then the network could not recover if both rings suffered East-West line failures simultaneously.

While the invention has been described with reference to particular example embodiments, further modifications and improvements which will occur to those in the art, may be made within the purview of the appended claims, without departing from the scope of the invention in its broader aspect.

I claim:

1. A balanced network for transporting a traffic signal with a working-to-protection bandwidth ratio higher than 0.5, comprising:

a ring network for connecting a first node and a second node, said nodes defining a first and a second ring arm;

one or more mesh arms connecting said first node and said second node;

wherein each arm includes one or more Add/Drop Multiplexer (ADM) nodes, and each arm has a protection bandwidth of 1/N×BW and a working bandwidth of (N−1)/N×BW, where BW is the capacity available on any line of said network, and N is the number of arms connecting said first and second nodes.

2. A balanced network as claimed in claim 1, wherein said working bandwidth comprises an add/drop bandwidth $W_{adm}$ of ½BW for connecting said ADM nodes, and a passthrough bandwidth $W_{pt}$ of (N−2)/2N×BW for connecting directly said first and said second node.

3. A network as claimed in claim 2, wherein in the case of an Interruption on one of said mesh arms, said first node divides said respective passthrough traffic of said arm affected by said interruption, into two equal West and East components, and switches said West and East components onto said protection bandwidth of all unaffected arms.

4. A balanced network as claimed In claim 2, wherein for N=3, said working bandwidth is ⅔BW and said protection bandwidth is ⅓BW for each of said ring arms and said mesh arms.

5. A balanced network as claimed in claim 4, wherein said add/drop bandwidth is ½BW and said passthrough bandwidth is ⅙BW, for each of said ring arms and mesh arm.

6. A balanced network as claimed in claim 2, wherein for N=4, said working bandwidth is ¾BW and said protection bandwidth is ¼BW for each of said ring arms and mesh arms.

7. A balanced network as claimed in claim 6, wherein said add/drop bandwidth is ½BW and said passthrough bandwidth is ¼BW.

8. A balanced network for transporting a traffic signal with a working-to-protection bandwidth ratio higher than 0.5, comprising:

a ring network for connecting a first node and a second node, said nodes defining a first and a second ring arm:

one or more mesh arms connecting said first node and said second node;

wherein each arm includes one or more Add/Drop Multiplexer (ADM) nodes, and each arm has a working bandwidth of (N−M)/N×BW, where BW is the capacity available on any line of said network, N is the number of arms connecting said first and second nodes, and M is the number of full line faults in said network.

9. A balanced network as claimed in claim 8, wherein $$\Sigma W_{failedarms} = (\Sigma (T-W)_{workingarms} - E$$

where: $W_{failedarms}$ is the working bandwidth on a failed arm, T is the total bandwidth on a non-failed arm and E is extra leftover protection bandwidth.

10. A method for creating a balanced transport network with a working/protection bandwidth ratio higher than 0.5, comprising:

providing N mesh arms between a first and a second node of balanced network, each arm comprising one or more Add Drop Multiplexer (ADM) nodes;

allocating to each said arm a working bandwidth of (N−1)N×BW and a protection bandwidth of 1/N×BW, where BW is the capacity available on any line or said network.

11. A method as claimed in claim 10, wherein said working bandwidth comprises an add/drop bandwidth $W_{adm}$ of 50% BW for connecting said add/drop multiplexing nodes along said respective arm, and a passthrough bandwidth $W_{pt}$ of(N−2)/2N B×W for connecting directly said fit and said second node.

12. A method as claimed in claim 10, further comprising, in the event of a line failure on one arm, at said first node, dividing said passthrough traffic of said one arm affected by said line failure, into (N−1) components of equal bandwidth;

switching each said component onto said protection bandwidth of each said arm unaffected by said interruption.

13. A method as claimed in claim 12, further comprising re-allocating the BW on said one arm equally between said add/drop traffic and protection traffic.

* * * * *